(12) United States Patent
Tasei et al.

(10) Patent No.: US 7,916,452 B2
(45) Date of Patent: Mar. 29, 2011

(54) METHOD OF PRODUCING A COIN-TYPE ELECTROCHEMICAL ELEMENT

(75) Inventors: Masatoshi Tasei, Kyoto (JP); Nario Niibo, Osaka (JP); Masashige Ashizaki, Oaska (JP); Yukio Nishioka, Kyoto (JP); Hirofumi Iwashima, Kyoto (JP); Koichi Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 908 days.

(21) Appl. No.: 11/665,643

(22) PCT Filed: Nov. 24, 2005

(86) PCT No.: PCT/JP2005/021529
§ 371 (c)(1), (2), (4) Date: Apr. 18, 2007

(87) PCT Pub. No.: WO2006/057274
PCT Pub. Date: Jun. 1, 2006

(65) Prior Publication Data
US 2008/0089011 A1     Apr. 17, 2008

(30) Foreign Application Priority Data

Nov. 25, 2004 (JP) ................. 2004-340223
Dec. 27, 2004 (JP) ................. 2004-376048
Jun. 16, 2005 (JP) ................. 2005-175953

(51) Int. Cl.
*H01G 9/00*     (2006.01)
(52) U.S. Cl. ........ 361/502; 361/503; 361/504; 361/509; 361/512; 361/519

(58) Field of Classification Search .................. 361/502, 361/503–504, 508–512, 516–519, 523–525, 361/528–529; 29/25.01, 25.03
See application file for complete search history.

(56) References Cited

U.S. PATENT DOCUMENTS

| | | | |
|---|---|---|---|
| 4,959,505 A | 9/1990 | Ott | |
| 5,478,670 A | 12/1995 | Hayasaka et al. | |
| 5,953,204 A * | 9/1999 | Suhara et al. | 361/502 |
| 6,236,561 B1 * | 5/2001 | Ogino et al. | 361/523 |
| 6,274,277 B1 * | 8/2001 | Mori et al. | 429/307 |
| 6,489,062 B1 * | 12/2002 | Watanabe et al. | 429/231.95 |
| 6,676,440 B1 | 1/2004 | Inamine et al. | |
| 6,733,544 B2 * | 5/2004 | Takasugi et al. | 29/25.03 |
| 6,771,486 B2 | 8/2004 | Morikawa et al. | |

(Continued)

FOREIGN PATENT DOCUMENTS

JP     58-107623     6/1983
(Continued)

*Primary Examiner* — Nguyen T Ha
(74) *Attorney, Agent, or Firm* — Wenderoth, Lind & Ponack, LLP.

(57) ABSTRACT

A coin-type electrochemical element enables the external lead terminal portions to be accurately and reliably attached to a first lid portion and to a second lid portion of the coin-type electrochemical element, and a method of its production. A coin-type electric double layer capacitor includes a first lid portion and a second lid portion. External lead terminal portions, each having a nearly triangular shape, are separately connected to the outer surfaces of the lid portions. Upon providing the external lead terminal portions having the triangular shape, a welded portion is allowed to have an increased area enabling the coin-type electrochemical element of even a small size to be accurately and reliably welded and making it possible to provide the coin-type electrochemical element having excellent reliability.

10 Claims, 5 Drawing Sheets

U.S. PATENT DOCUMENTS

| | | |
|---|---|---|
| 7,169,506 B2 | 1/2007 | Watanabe et al. |
| 7,215,533 B2 * | 5/2007 | Kurita et al. .................. 361/523 |

FOREIGN PATENT DOCUMENTS

| | | |
|---|---|---|
| JP | 63-73613 | 4/1988 |
| JP | 1-89723 | 6/1989 |
| JP | 01-89723 | 6/1989 |
| JP | 01-259517 | 10/1989 |
| JP | 3-56123 | 5/1991 |
| JP | 3-73425 | 7/1991 |
| JP | 3-154317 | 7/1991 |
| JP | 05-101976 | 4/1993 |
| JP | 6-215738 | 8/1994 |
| JP | 6-349682 | 12/1994 |
| JP | 2002-298804 | 10/2002 |
| JP | 2004-221181 | 8/2004 |
| JP | 2004-327201 | 11/2004 |

* cited by examiner

METHOD OF PRODUCING A COIN-TYPE ELECTROCHEMICAL ELEMENT

BACKGROUND OF THE INVENTION

1. Technical Field

This invention relates to a method of producing a coin-type electrochemical element which is used, for example, mounted on a surface and which has external lead terminal portions, and to a coin-type electrochemical element.

2. Background Art

Figure 4:
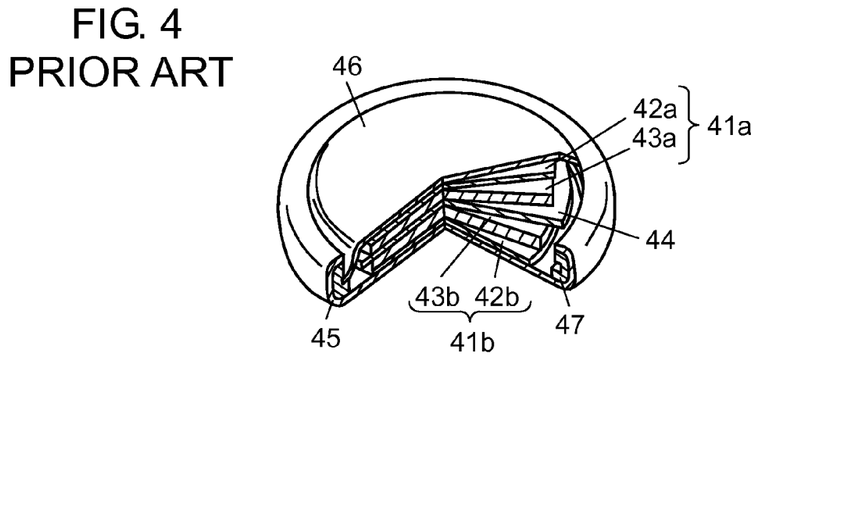
FIG. 4 is a perspective view illustrating, in a partly cut-away manner, a conventional coin-type electric double layer capacitor.

As the coin-type electrochemical elements of this type, there have been known an electric double layer capacitor and a button cell. FIG. 4 is a perspective view illustrating, in a partly cut-away manner, the constitution of a conventional electric double layer capacitor. A pair of electric double layer electrodes 41a and 41b are arranged facing each other via insulating separator 44. Electric double layer electrode 41a has disk-like sheet or foil (hereinafter called sheet) 42a, and polarizing electrode 43a which is an activated carbon layer is formed for sheet 42a. Further, electric double layer electrode 41b has sheet 42b, and polarizing electrode 43b which is an activated carbon layer is formed for sheet 42b.

Upper lid portion 46 of a metal container is formed on one main surface side of disk-like sheet 42a of a valve metal, and lower lid portion 45 of the metal container is separately formed on one main surface side of disk-like sheet 42b of the valve metal. A non-aqueous electrolyte which is not shown is filling electric double layer electrodes 41a, 41b and separator 44. Lower lid portion 45 and upper lid portion 46 are joined together so as to be closed via insulating ring packing 47 provided along the circumferential edges thereof.

Figure 5A:
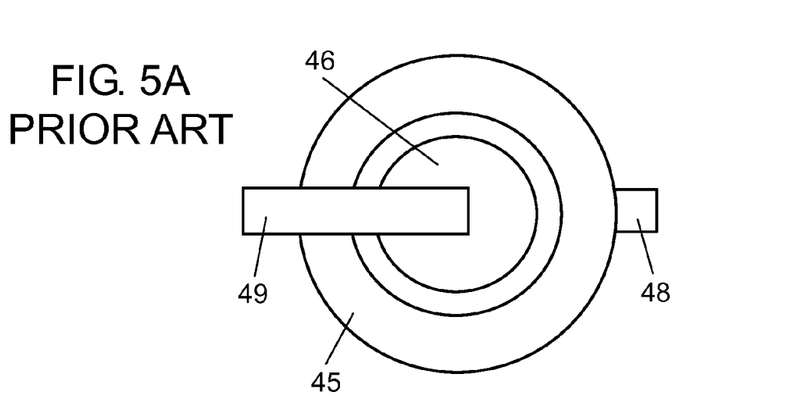
FIG. 5A is a plan view of when the conventional coin-type electric double layer capacitor is mounted.
Figure 5B:
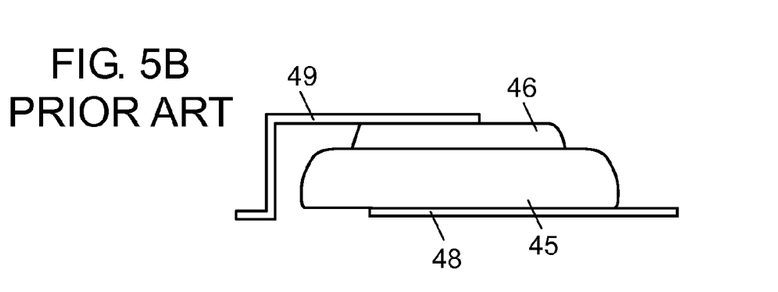
FIG. 5B is a side view illustrating a state of when the conventional coin-type electric double layer capacitor shown in FIG. 5A is mounted.

FIG. 5A is a plan view of when an external lead terminal portion is connected to the electric double layer capacitor. FIG. 5B is a side view of when the external lead terminal portion is connected to the electric double layer capacitor.

FIGS. 5A and 5B are illustrating a state where external lead terminal portions 48 and 49 that have already been machined and cut into pieces are arranged by a parts feeder and are fed by a chuck onto the electric double layer capacitor, and are welded (not shown) to parts of lower lid portion 45 and upper lid portion 46.

Figure 6A:
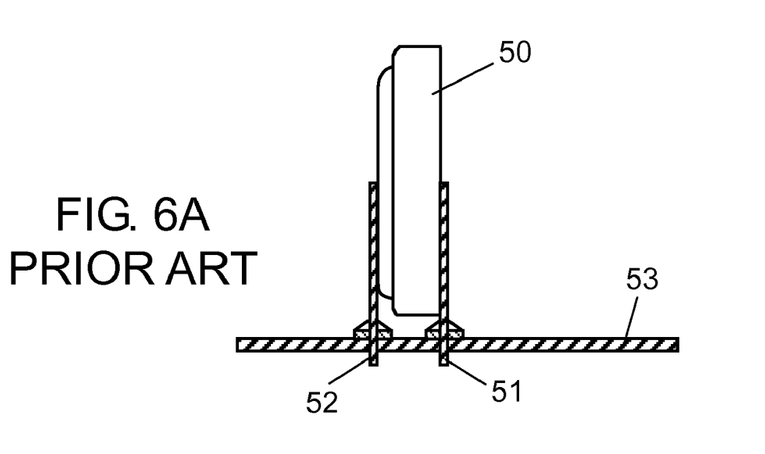
FIG. 6A is a side view illustrating a state of when the conventional coin-type electric double layer capacitor for surface mounting is vertically arranged.
Figure 6B:
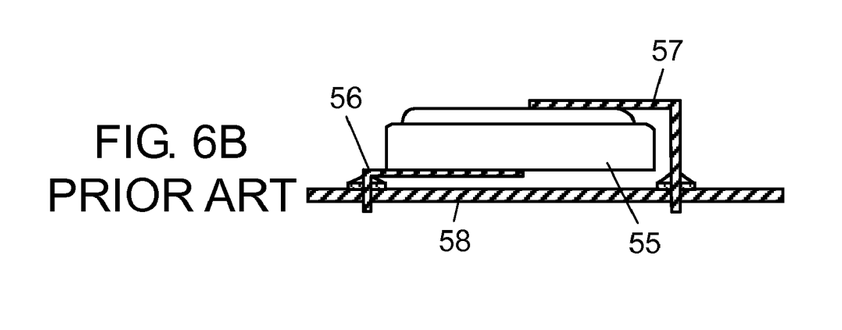
FIG. 6B is a side view illustrating a state of when the conventional coin-type electric double layer capacitor for surface mounting is laid down.
Figure 6C:
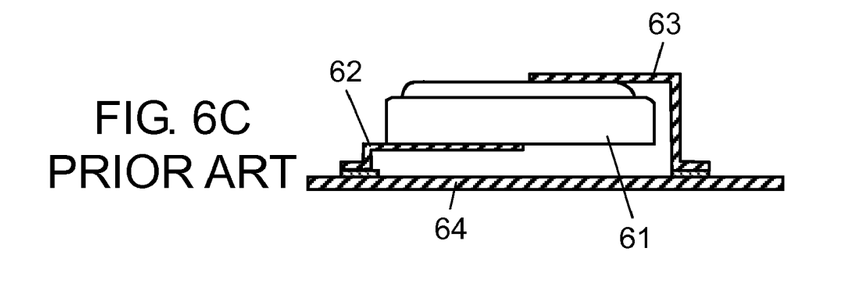
FIG. 6C is a side view illustrating another state of when the conventional coin-type electric double layer capacitor for surface mounting is laid down.

FIGS. 6A, 6B and 6C are side views of when the external lead terminal is mounted on a printed board. FIG. 6A illustrates a state where the electric double layer capacitor is vertically placed. That is, both lower lid portion 45 and upper lid portion 46 are arranged at right angles with substrate 53.

External lead terminal portions 51 and 52 are connected to the outer surfaces of lower lid portion 45 and upper lid portion 46 of electric double layer capacitor 50. External lead terminal portions 51 and 52 are inserted in the holes formed in printed board 53, and the inserted portions are soldered to accomplish the mounting.

In FIG. 6B, the electric double layer capacitor is laid down. That is, both lower lid portion 45 and upper lid portion 46 are arranged in parallel with the printed board 58. External lead terminal portions 56 and 57 are connected to the outer surfaces of lower lid portion 45 and upper lid portion 46 of electric double layer capacitor 55. Namely, external lead terminal portions 56 and 57 are inserted in the holes formed in printed board 58, and the inserted portions are soldered to accomplish the mounting.

In FIG. 6C, the electric double layer capacitor 61 is laid down like in FIG. 6B. External lead terminal portions 62 and 63 are connected to the outer surfaces of lower lid portion 45 and upper lid portion 46. The difference of FIG. 6C from FIG. 6B is that the ends of external lead terminal portions 62 and 63 are arranged nearly in parallel with the connection land surface of printed board 64, and are mounted by soldering through a step of reflow.

In the foregoing was described an example of the electric double layer capacitor. In a button cell, too, electrodes having a separator between the positive electrode and the negative electrode are contained in the lower lid portion and in the upper lid portion of a two-abutted metal container, and the structure exhibits the appearance like that of the above electric double layer capacitor.

The electric double layer capacitors and button cells of the above structures have been disclosed in, for example, Japanese Patent Unexamined Publication No. 3-163813 and Japanese Patent Unexamined Publication No. 8-203497.

In the above coin-type electrochemical element, however, the anode (positive electrode) side is usually facing the cathode (negative electrode) side in the external lead terminal portion. If the external lead terminal portion of this constitution is used, however, the step becomes very cumbersome for welding the lower lid portion to the upper lid portion in the coin-type electrochemical element. Therefore, either external lead terminal portion must be cut into apiece so as to be fed, which is inconvenient.

In the coin-type electrochemical element of this constitution, further, deviation occurs in the positions of the external lead terminal portions welded to the lower lid portion and to the upper lid portion. In the case of small products, in particular, the external lead terminal portions are small, too, involving difficulty in supplying and positioning the coin-type electrochemical elements.

Besides, wide contact areas cannot be obtained between the conventional external lead terminal portions and the coin-type electrochemical element, and the welding strength may be weakened.

SUMMARY OF THE INVENTION

This invention accurately and reliably attaches the external lead terminal portions to the first lid portion (lower lid portion) and to the second lid portion (upper lid portion) of the coin-type electrochemical element by overcoming the above inconveniences inherent in the prior art. The invention further provides a coin-type electrochemical element which helps minimize the mounting area of the printed board, and can be excellently produced maintaining reliability.

The invention is concerned with a method of producing a coin-type electrochemical element, comprising the steps of:

arranging and welding a first lid portion of a coin-type electrochemical element to a terminal portion of a first metal lead frame having external lead terminal portions continuously in the lengthwise direction;

welding an external lead terminal portion of a second metal lead frame to a second lid portion of the coin-type electrochemical element; and separating the external lead terminal portions from the first and second metal lead frames welded to the coin-type electrochemical element.

The invention is further concerned with a coin-type electrochemical element having external lead terminal portions of a nearly triangular shape connected to the outer surfaces of the first and second lid portions.

According to the present invention, the first lid portion of the coin-type electrochemical element is arranged at the external lead terminal portion of the first metal lead frame and is welded thereto and, thereafter, the external lead terminal portion of the second metal lead frame is arranged at the second lid portion of the coin-type electrochemical element and is welded thereto. This offers such an action and advantage that the external lead terminals can be accurately and reliably attached to the first lid portion and to the second lid portion of the coin-type electrochemical element.

Further, the external lead terminal portions are formed in nearly a triangular shape making it possible to widen the areas for welding the external lead terminal portions to the first lid portion and to the second lid portion, and to improve the reliability for welding. In particular, the external lead terminal portions can be accurately connected even for the coin-type electrochemical elements of small sizes (diameters φ of 3 to 5 mm).

Further, concerning the stainless steel materials constituting the first and second lid portions, the upper lid portion contains Ni, Cr and Mo in amounts larger than the amounts thereof in the lower lid portion. Therefore, the coin-type electrochemical element exhibits a sufficiently large corrosion resistance even against a charging environment of a high voltage exceeding, for example, 2.8 V.

DETAILED DESCRIPTION OF THE INVENTION

Embodiment 1

Figure 1:
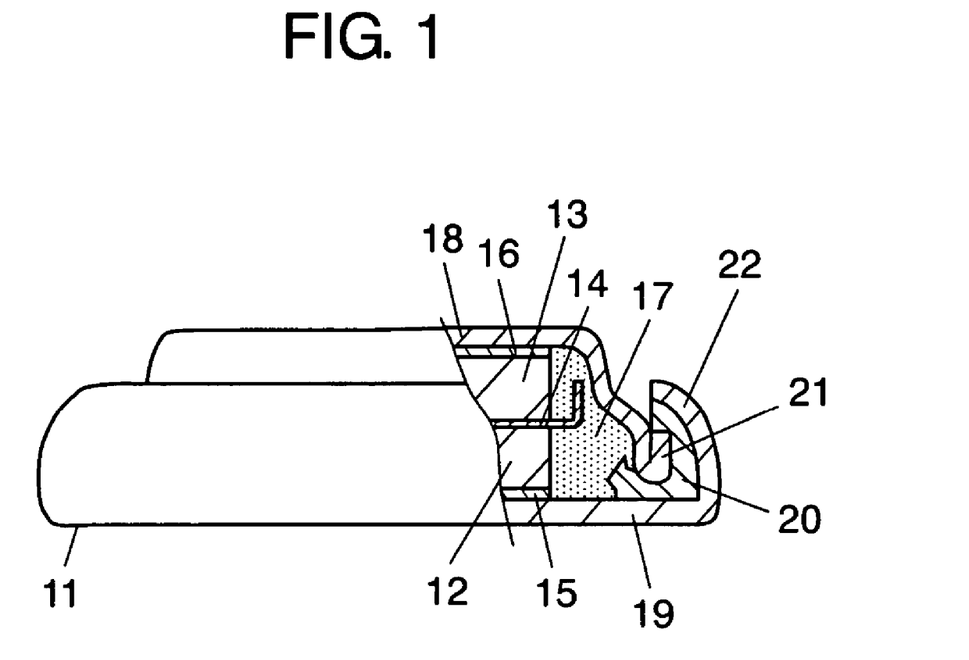
FIG. 1 is a side view illustrating, in a partly cut-away manner, the constitution of a coin-type electric double layer capacitor according to an embodiment 1 of the invention.

FIG. 1 is a side view illustrating, in a partly cut-away manner, the constitution of a coin-type electric double layer capacitor for surface mounting. The coin-type electric double layer capacitor 11 includes polarizing electrode 12 comprising an activated carbon electrode on the anode side and polarizing electrode 13 comprising an activated carbon electrode on the cathode side facing each other via separator 14. Polarizing electrode 12 on the anode side is provided with collector 15 for the anode, and polarizing electrode 13 on the cathode side is provided with collector 16 for the cathode. A petroleum coke-type activated carbon powder having an average particle size of 5 μm, carbon black having an average particle size of 0.05 μm as an electric conductivity-imparting agent and a water-soluble binder solution in which a carboxymethyl cellulose is dissolved (concentration: 50%) are mixed together at a weight ratio of 10:2:1, and are kneaded together to a sufficient degree by using a kneader. The thus obtained kneaded product is formed into pellets which are, then, dried in the open air at 100° C. for one hour. Next, a separator is interposed between two pieces of pellets to form a pair of polarizing electrodes. Thereafter, the pair of polarizing electrodes 12, and separator 14 are impregnated with electrolyte 17 comprising 75% by weight of a propylene carbonate, 20% by weight of an EMIBF$_4$ (1-ethyl-3-methylimidazolium tetrafluoroborate) and 5% by weight of a 4-ethyl ammonium-4-fluoroborate, and are contained in a container space constituted by upper lid portion 18 that serves as the cathode terminal and lower lid portion 19 that serves as the anode terminal.

Upper lid portion 18 is made of a stainless steel SUS304 while lower lid portion 19 is made of a stainless steel SUS304 but containing 8.29% by weight of Ni, 18.12% by weight of Cr and 0.19% by weight of Mo.

Next, electrically insulating ring packing 20 is arranged between folded portion 21 formed along the outer periphery of upper lid portion 18 and the outer periphery of lower lid portion 19, and end portion 22 of the outer periphery of lower lid portion 19 is curled. Thus, folded portion 21 of upper lid portion 18 is wrapped with ring packing 20 from the outer side to thereby air-tightly seal the container space in which the pair of polarizing electrodes 12 and 13 are contained to fabricate coin-type electric double layer capacitor 11.

Next, described below is a method of producing the coin-type electric double layer capacitor for mounting.

Figure 2A:
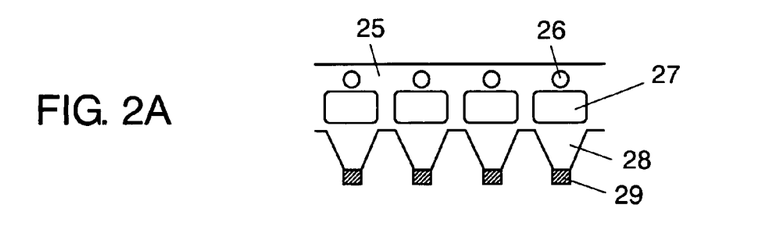
FIG. 2A is a plan view of a first metal lead frame according to an embodiment 2 of the invention.
Figure 2B:
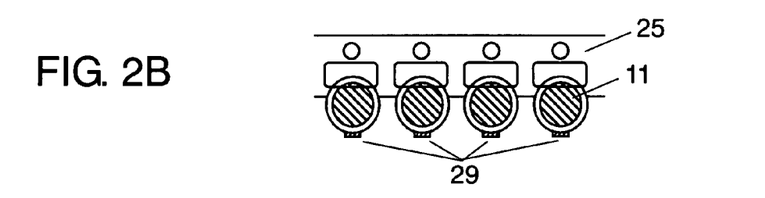
FIG. 2B is a plan view of connecting the coin-type electric double layer capacitors according to the embodiment 2 of the invention.
Figure 2C:
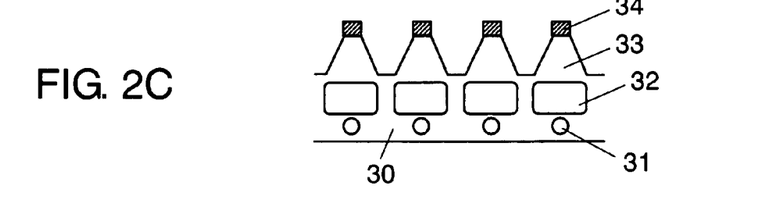
FIG. 2C is a plan view of a second metal lead frame in the coin-type electric double layer capacitor according to the embodiment 2 of the invention.
Figure 2D:
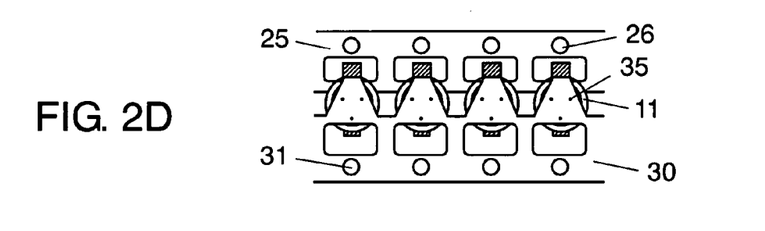
FIG. 2D is a plan view of connecting the metal lead frame to the coin-type electric double layer capacitor according to the embodiment 2 of the invention.
Figure 2E:
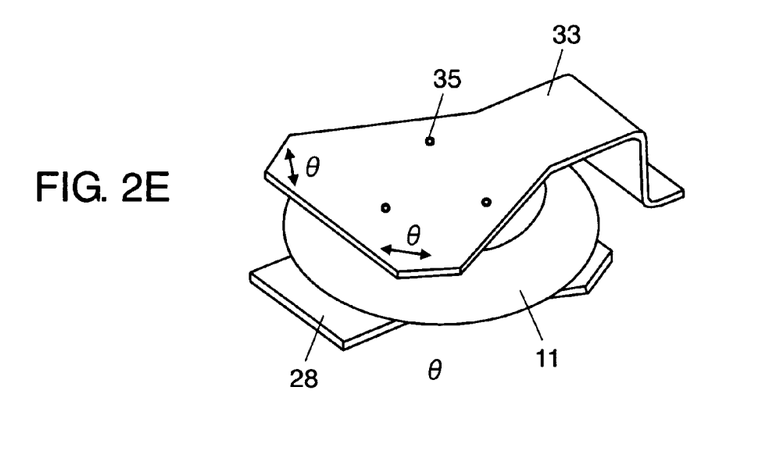
FIG. 2E is a perspective view illustrating the constitution of the coin-type electric double layer capacitor for mounting fabricated according to the embodiment 2 of the invention.

FIG. 2A is a plan view of a first metal lead frame according to the embodiment 1. FIG. 2B is a plan view illustrating a state where the coin-type electric double layer capacitors are connected to the first metal lead frame. FIG. 2C is a plan view of a second metal lead frame. FIG. 2D is a plan view connecting the coin-type electric double layer capacitors to the first metal lead frame and to the second metal lead frame. FIG. 2E is a perspective view illustrating the coin-type electric double layer capacitor for mounting.

Referring to FIG. 2A, pilot pinholes 26 for determining the feeding position are perforated in first metal lead frame 25. Openings 27 are perforated nearly at the central portion of first metal lead frame 25. External lead terminal portions 28 of nearly a triangular shape are formed at positions separated away from pilot pinholes 26, and external connection portions 29 are provided at the ends thereof. The external connection portions 29 are provided in a direction at right angles with the lengthwise direction of metal lead frame 25, i.e., in the direction of the short side of first metal lead frame 25.

When conveying onto first metal lead frame 25 or when conducting some processing, first metal lead frame 25 is moved from the right toward the left or in the reverse direction as viewed in FIG. 2A from the front. Pilot pinholes 26 can be used for executing at least any one processing such as moving and positioning first metal lead frame 25. Pilot pinholes 26, however, are not necessarily the indispensable constituent requirement. For example, first metal lead frame 25 can be moved and positioned without using pilot pinholes 26 but by using openings 27 or by using deformed portions formed by deforming portions of openings 27.

FIG. 2B illustrates a state where coin-type electric double layer capacitors 11 are arranged at nearly triangular external lead terminal portions 28 of first metal lead frame 25, and external lead terminal portions 28 are connected to lower lid portions of coin-type electric double layer capacitors 11 by laser welding.

Referring, next, to FIG. 2C, second metal lead frame 30 is provided. Second metal lead frame 30 has, basically, the same shape and the same size as first metal lead frame 25 provided above. That is, second metal lead frame 30 has pilot pinholes 31 and openings 32. Further, external connection portions 34 are folded from external lead terminal portions 33, so that external connection portions 34 and external connection portions 29 are at planar positions. Namely, these connection portions are arranged on the same plane.

Referring next to FIG. 2D, external lead terminal portions 33 of second metal lead frame 30 are arranged on the upper lid portions of coin-type electric double layer capacitors 11 connected to first metal lead frame 25. Here, the positioning is accomplished by using pilot pinholes 26 and 31, and external lead terminal portions 33 are fixed by laser-welded portions 35. Pilot pinholes 26, 31 that are to be used may be perforated in at least either metal lead frame 25 or metal lead frame 30.

Finally, by using a jig or a tool, external lead terminal portions 28 are cut off from openings 27 in first metal lead frame 25 and, similarly, second metal lead frames 30, too, are cut off to obtain coin-type electric double layer capacitors 11 for mounting as shown in FIG. 2E.

In the present invention, external lead terminal portions 28 and 33 are protruded in the direction of the short side of metal lead frames 25, 30, and coin-type electric double layer capacitors 11 are mounted to obtain wide areas for welding onto the upper lid portions and the lower lid portions improving reliability of welding. First metal lead frame 25 and second metal lead frame 30 of the above structures make it possible to accurately connect external lead terminal portions 28, 33 to coin-type electric double layer capacitors 11 of even small sizes (diameters φ of 3 to 5 mm) and, therefore, to shorten the production time to one-third as compared to the prior art.

Further, first and second metal lead frames 25 and 30 are continuous hoops having pilot pinholes 26, 31, and are capable of easily holding external lead terminal portions 28 and 33 at the time of welding. This prevents the deviation in the welding position from occurring and makes it possible to reliably connect the lead terminal portions.

External lead terminal portions 28, 33 of first and second metal lead frames 25, 30 are welded to coin-type electrochemical elements 11 facing each other and facilitating the work for separating external lead terminal portions 28, 33 from first and second metal lead frames 25, 30. Besides, the cut portions have an obtuse angle (angle θ in FIG. 2E), and the elements can be easily conveyed into the packaging materials excellently maintaining safety.

Further, notches may be formed in external connection portions 34 of second metal lead frame 30 shown in FIG. 2C.

Further, first and second metal lead frames 25 and 30 used in the embodiment 1 may be used upside down. Though the embodiment 1 has dealt with coin-type electric double layer capacitor 11, button cells, too, may be dealt with.

Embodiment 2

Figure 3A:
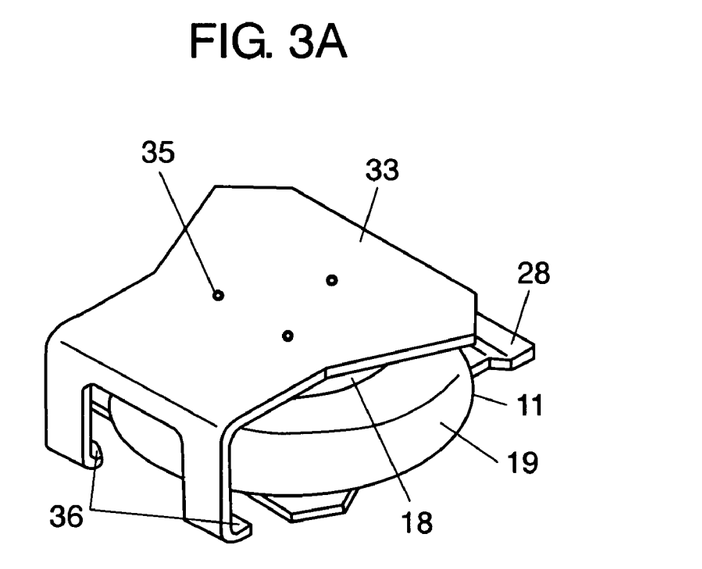
FIG. 3A is a perspective view illustrating the constitution of the coin-type electric double layer capacitor for mounting according to the embodiment 2 of the invention.
Figure 3B:
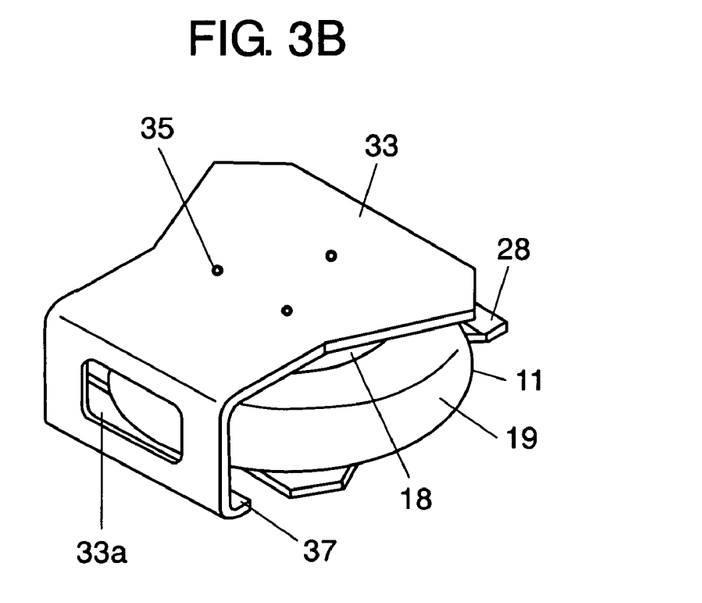
FIG. 3B is another perspective view illustrating the constitution of the coin-type electric double layer capacitor for mounting according to the embodiment 2 of the invention.

FIGS. 3A and 3B are perspective views of the coin-type electric double layer capacitor according to the embodiment 2.

FIG. 3A illustrates coin-type electric double layer capacitor 11, upper lid portion 18, lower lid portion 19, external lead terminal portion 33 on the cathode side, and external lead terminal portion 28 on the anode side. External lead terminal portions 28 and 33 are nearly of a triangular shape and have a thickness of 0.10 mm. External lead terminal portion 28 of the anode side is spot-welded or laser-welded to lower lid portion 19 of coin-type electric double layer capacitor 11, and external lead terminal 33 of the cathode side is spot-welded or laser-welded to upper lid portion 18 at welding portions 35.

External lead terminal portion 33 is attached in parallel with external lead terminal portion 28 of the anode side. Further, external lead terminal portion 33 of the cathode side has a portion of external connection surface 36 folded in an L-shape so as to be faced by the connection portion of the surface mounting.

Referring to FIG. 3B, further, external lead terminal portion 33 on the cathode side has notch 33a formed in at least either the side surface thereof or the bottom surface thereof. External connection surface 37 in which the notch is formed is folded in a U-shape so that the connection portions of the surface mounting are in the same direction. With notch 33a being formed in the side surface, external lead terminal portion 33 on the cathode side can be brought close to the side surface of lower lid 19 to decrease the size as a whole.

With external lead terminal portions 28 and 33 being formed, for example, in nearly a triangular shape in the above constitution, it is possible to increase the welding areas. A reliable connection is accomplished to lower lid 19 and to upper lid 18 of coin-type electric double layer capacitor 11 for surface mounting. Besides, accurate and reliable welding can be accomplished for coin-type electric double layer capacitor 11 for surface mounting of even a small size (diameter φ of 3 to 5 mm).

Besides, external lead terminal portions 28, 33 are formed in nearly a triangular shape, and notch 33a is formed in the side surface of external lead terminal portion 33 of the cathode side. Therefore, lower lid 19 of coin-type electrochemical element 11 for surface mounting can be reliably connected without being brought into contact with external lead terminal 33 of the cathode side. This makes it possible to minimize the mounting area of the printed board and to realize a high-density mounting. Besides, the pitch can be decreased between external lead terminal portions 28 and 33 of the anode side and the cathode side.

Upon forming notch 33a in connection portion 36 for surface mounting of external lead terminal portion 33 on the cathode side, further, formation of solder fillets is suppressed preventing short-circuiting between coin-type electrochemical element 11 and external lead terminal portion 33 on the cathode side.

It is further desired that a gap is 1.0 to 1.5 mm between lower lid 19 and the side surface of external lead terminal portion 33 on the cathode side.

When SUS304 is used for the lower lid and for the upper lid, the contents of Ni, Cr and Mo contained in the stainless steel of the lower lid are selected to be larger than those contained in the upper lid. This causes the coin-type electrochemical element to exhibit sufficiently large corrosion resistance in an electrically charging environment of high voltages in excess of, for example, 2.8 V.

By forming lower lid 19 and upper lid 18 using different materials, further, the corrosion can be prevented even when the electric charging is conducted at a high voltage of, for example, 3.3 V, and a product having excellent reliability can be provided.

With the external lead terminal portions being formed in nearly a triangular shape, further, external connection surfaces 36 and 37 may be formed in an L-shape or in a U-shape.

The coin-type electrochemical elements were produced based on the production method of the invention and their electrical characteristics were compared with the conventional counterpart.

Example 1

A coin-type electric double layer capacitor having a rated voltage of 3.3 V and a capacity of 0.2 F was fabricated according to the embodiment 1.

Example 2

A coin-type electric double layer capacitor same as that of Example 1 was fabricated according to embodiment 1 while selecting the amount of Ni to be 10.75% by weight, amount of Cr to be 16.84% by weight and amount of Mo to be 2.13% by weight in the stainless steel of lower lid portion 19.

Example 3

A coin-type electric double layer capacitor was fabricated according to embodiment 1 while selecting the amount of Ni to be 22.51% by weight, amount of Cr to be 21.37% by weight and amount of Mo to be 5.13% by weight in the stainless steel of lower lid portion 19. The conditions in other respects were the same as those of Example 1.

Example 4

A coin-type electric double layer capacitor same as that of Example 1 was fabricated according to embodiment 1 while selecting the amount of Ni to be 17.73% by weight, amount of Cr to be 20.01% by weight and amount of Mo to be 6.07% by weight in the stainless steel of lower lid portion 19. The conditions in other respects were the same as those of Example 1.

Example 5

A coin-type electric double layer capacitor same as that of Example 1 was fabricated according to embodiment 1 while selecting the amount of Ni to be 24.19% by weight, amount of Cr to be 23.00% by weight and amount of Mo to be 5.54% by weight in the stainless steel of lower lid portion 19. The conditions in other respects were the same as those of Example 1.

Example 6

A coin-type electric double layer capacitor same as that of Example 1 was fabricated according to embodiment 1 while selecting the amount of Ni to be 35.47% by weight, amount of Cr to be 23.27% by weight and amount of Mo to be 7.48% by weight in the stainless steel of lower lid portion 19. The conditions in other respects were the same as those of Example 1.

Comparative Example

A comparative Example was conducted for comparison with the testing samples of the present invention. Namely, a coin-type electric double layer capacitor was fabricated in the same manner as in Example 1 but selecting the amount of Ni to be 8.12% by weight, the amount of Cr to be 18.22% by weight but containing no Mo in the stainless steel of lower lid portion 19. The conditions in other respects were the same as those of Example 1.

The thus fabricated coin-type electric double layer capacitors for surface mounting of Examples 1 to 6 of the present invention and of the Comparative Example were subjected to the high-temperature high-humidity load testing for confirming the resistance against the leakage of electrolyte under a high-temperature and high-humidity condition being applied with a rated voltage. Table 1 shows the results of inspecting the leakage of the electrolyte.

Further, the temperature was maintained constant such that the temperature of the electrolyte was 60° C. and after the application of a voltage for 24 hours, the surfaces of the positive electrodes were observed by using a metal microscope to judge the presence of corrosion and damage. The results were as shown in Table 1. In Table 1, double circles (⊚) mean that the results were very favorable, single circles (○) mean that the results were favorable, and a cross (X) means that the result was poor.

TABLE 1

| | Material of lower lid | | | | Material of upper lid | Resistance against leakage of electrolyte | Corrosion resistance at 60° C. and 3.3 V |
|---|---|---|---|---|---|---|---|
| | Ni | Cr | Mo | Fe | | | |
| Example 1 | 8.29 | 18.12 | 0.19 | remainder | SUS304 | ⊚ | |
| Example 2 | 10.75 | 16.84 | 2.13 | remainder | SUS304 | ⊚ | ○ |
| Example 3 | 22.51 | 21.37 | 5.13 | remainder | SUS304 | ⊚ | ○ |
| Example 4 | 17.73 | 20.01 | 6.07 | remainder | SUS304 | ⊚ | ⊚ |
| Example 5 | 24.19 | 23.00 | 5.54 | remainder | SUS304 | ⊚ | ⊚ |
| Example 6 | 35.47 | 23.27 | 7.48 | remainder | SUS304 | ⊚ | ⊚ |
| Comparative Example | 8.12 | 18.22 | 0 | remainder | SUS304 | ⊚ | X |

As is obvious from Table 1, it was learned that corrosion resistance was not good in the Comparative Example in which no Mo was contained in the material of the lower lid, while corrosion resistance was excellent in Examples 1 to 6 of the present invention which contained Mo.

Concerning the material of the lower lid, Ni is effective in suppressing the precipitation of intermetallic compounds such as a σ-phase and a X-phase. When the structure is the austenite, Ni is an essential element, and its content must be at least 20% by weight or more. When the content thereof exceeds 40% by weight, however, hot workability deteriorates and hot deformation resistance increases to hinder the productivity. Therefore, the upper limit of content thereof is set to be 40% by weight. Preferably, the content of Ni is 24 to 37% by weight and, more preferably, 30 to 36% by weight.

Cr is an element for improving the corrosion resistance and must be contained in an amount of not smaller than 20% by weight to obtain its effect. If its content exceeds 30% by weight, however, formation of the intermetallic compounds such as a σ-phase and a X-phase accelerates to rather deteriorate the corrosion resistance. Therefore, the content of Cr is set to be 20 to 30% by weight.

Mo is an element effective in improving the corrosion resistance and must be contained in an amount of not smaller than 5% by weight to obtain its effect. If its content exceeds 10% by weight, however, precipitation of the intermetallic compounds accelerates to rather deteriorate the corrosion resistance. Therefore, the content of Mo is set to be 5 to 10% by weight. It is desired that the content of Mo is not smaller than 6% by weight and, more desirably, not smaller than 7% by weight.

According to the method of producing the coin-type electrochemical element and the coin-type electrochemical element of the invention, surface-mounting parts of small sizes are obtained making it possible to decrease the size of a circuit portion for backing up the power source for a cell phone or a digital camera or for so working as an auxiliary power source, offering a high industrial applicability.

The invention claimed is:

1. A method of producing a coin-type electrochemical element, comprising:
   arranging and welding a first lid portion of a coin-type electrochemical element to an external lead terminal portion of a first metal lead frame having external lead terminal portions continuously in the lengthwise direction;
   welding the external lead terminal portion of a second metal lead frame to a second lid portion of the coin-type electrochemical element; and
   separating the external lead terminal portions from the metal lead frames welded to the coin-type electrochemical element;
   wherein a plurality of pilot pinholes are perforated in at least either the first metal lead frame or the second metal lead frame in the lengthwise direction of the metal lead frame, and the metal lead frame is moved by using the pilot pinholes.

2. The method of producing a coin-type electrochemical element of claim 1, wherein the external lead terminal portion welded to at least either the first lid portion or the second lid portion assumes a U-shape, and a notch is formed in at least a portion of the side surface of the external lead terminal portion that is mounted on a printed board.

3. The method of producing a coin-type electrochemical element of claim 1, wherein a notch is formed in the side surface of the external lead terminal portion welded to at least either the first lid portion or the second lid portion.

4. A method of producing a coin-type electrochemical element, comprising:
   arranging and welding a first lid portion of a coin-type electrochemical element to an external lead terminal portion of a first metal lead frame having external lead terminal portions continuously in the lengthwise direction;
   welding the external lead terminal portion of a second metal lead frame to a second lid portion of the coin-type electrochemical element; and
   separating the external lead terminal portions from the metal lead frames welded to the coin-type electrochemical element;
   wherein the external lead terminal portions of the first and second metal lead frames welded to the first lid portion and to the second lid portion are so separated away as to assume a triangular shape.

5. A method of producing a coin-type electrochemical element, comprising:
   arranging and welding a first lid portion of a coin-type electrochemical element to an external lead terminal portion of a first metal lead frame having external lead terminal portions continuously in the lengthwise direction;
   welding the external lead terminal portion of a second metal lead frame to a second lid portion of the coin-type electrochemical element; and
   separating the external lead terminal portions from the metal lead frames welded to the coin-type electrochemical element;
   wherein the external lead terminal portion welded to at least either the first lid portion or the second lid portion assumes a U-shape, and a notch is formed in at least a portion of the side surface of the external lead terminal portion that is mounted on a printed board.

6. The method of producing a coin-type electrochemical element of claim 5, wherein external connection portions are provided at the ends of the external lead terminal portions in a direction at right angles with the lengthwise direction of the first and second metal lead frames.

7. The method of producing a coin-type electrochemical element of claim 5, wherein the external lead terminal portions of the first and second metal lead frames are arranged facing each other holding the coin-type electrochemical element therebetween, and are welded to the lid portions of the coin-type electrochemical element.

8. A method of producing a coin-type electrochemical element, comprising:
   arranging and welding a first lid portion of a coin-type electrochemical element to an external lead terminal portion of a first metal lead frame having external lead terminal portions continuously in the lengthwise direction;
   welding the external lead terminal portion of a second metal lead frame to a second lid portion of the coin-type electrochemical element; and
   separating the external lead terminal portions from the metal lead frames welded to the coin-type electrochemical element;
   wherein a notch is formed in the side surface of the external lead terminal portion welded to at least either the first lid portion or the second lid portion.

9. The method of producing a coin-type electrochemical element of claim 8, wherein external connection portions are provided at the ends of the external lead terminal portions in a direction at right angles with the lengthwise direction of the first and second metal lead frames.

10. The method of producing a coin-type electrochemical element of claim 8, wherein the external lead terminal portions of the first and second metal lead frames are arranged facing each other holding the coin-type electrochemical element therebetween, and are welded to the lid portions of the coin-type electrochemical element.

* * * * *